(12) United States Patent
Baekelandt et al.

(10) Patent No.: US 8,807,126 B2
(45) Date of Patent: Aug. 19, 2014

(54) SAWING ROPE

(75) Inventors: Tom Baekelandt, Dadizele (BE);
Roland Groenen, Horebeke (BE);
Steven Van Der Linden, Brakel (BE);
Peter Persoone, Deinze (BE)

(73) Assignee: NV Bekaert SA, Zwevegem (BE)

( * ) Notice: Subject to any disclaimer, the term of this patent is extended or adjusted under 35 U.S.C. 154(b) by 169 days.

(21) Appl. No.: 13/505,332

(22) PCT Filed: Nov. 16, 2010

(86) PCT No.: PCT/EP2010/067527
§ 371 (c)(1),
(2), (4) Date: May 1, 2012

(87) PCT Pub. No.: WO2011/061166
PCT Pub. Date: May 26, 2011

(65) Prior Publication Data
US 2012/0210993 A1    Aug. 23, 2012

(30) Foreign Application Priority Data
Nov. 17, 2009  (EP) .................................... 09176164

(51) Int. Cl.
*B28D 1/08*   (2006.01)

(52) U.S. Cl.
USPC .................................. 125/21; 125/22; 125/36

(58) Field of Classification Search
USPC .......................................... 125/12, 21, 22, 36
See application file for complete search history.

(56) References Cited

U.S. PATENT DOCUMENTS

| | | | |
|---|---|---|---|
| 1,643,110 A * | 9/1927 | Briggs ......................... | 403/368 |
| 2,679,839 A | 6/1954 | Metzger | |
| 2,773,495 A | 12/1956 | Lefevre | |
| 3,847,569 A | 11/1974 | Snow | |
| 4,015,931 A | 4/1977 | Thakur | |
| 4,907,564 A | 3/1990 | Sowa et al. | |
| 5,080,086 A | 1/1992 | Tomlinson et al. | |
| 6,105,568 A * | 8/2000 | Yu ................................ | 125/18 |
| 6,131,558 A * | 10/2000 | Weber ............................ | 125/21 |
| 6,526,960 B2 | 3/2003 | Asada et al. | |
| 7,089,925 B1 | 8/2006 | Lin et al. | |
| 2004/0139594 A1* | 7/2004 | Schrall et al. .................... | 29/557 |

FOREIGN PATENT DOCUMENTS

| | | |
|---|---|---|
| DE | 71 23 369 U | 9/1971 |
| DE | 2 254 328 A1 | 5/1974 |
| EP | 0 364 322 A1 | 4/1990 |
| EP | 0 486 238 A2 | 5/1992 |
| FR | 66 353 E | 2/1957 |

(Continued)

Primary Examiner — Lee D Wilson
Assistant Examiner — Shantese McDonald
(74) Attorney, Agent, or Firm — Foley & Lardner LLP

(57) ABSTRACT

A sawing rope (270) with abrasive elements (506) fixed on a steel rope (502) with a polymer jacket (504) is described and claimed. The abrasive elements (506) are made of a metallic sleeve on which an abrasive layer is deposited by means of electrolytic deposition, by means of sintering or by means of cladding for example laser cladding. Characteristic about this sawing rope (270) in view of the prior known sawing ropes is that each sleeve shows a connection or closure. Such a connection makes it possible to attach abrasive elements (506) on the rope without having to thread them on the rope (270) as is needed when making prior-art sawing ropes. The inventive sawing rope (270) can therefore be made in long lengths in a very efficient way.

20 Claims, 3 Drawing Sheets

(56) References Cited

FOREIGN PATENT DOCUMENTS

| | | |
|---|---|---|
| GB | 759505 A | 10/1956 |
| JP | 59-159234 A | 9/1984 |
| JP | 1-114228 U | 8/1989 |
| JP | 3-124338 A | 5/1991 |
| JP | 6-63931 A | 3/1994 |
| JP | 7-68533 A | 3/1995 |
| JP | 9-155630 A | 6/1997 |
| JP | 2006-102905 A | 4/2006 |
| SU | 654424 A1 | 4/1979 |
| SU | 1273567 A1 | 11/1986 |
| SU | 1500780 A1 | 8/1989 |
| WO | WO 95/00275 A1 | 1/1995 |
| WO | WO 02/40207 A1 | 5/2002 |
| WO | WO 02/055248 A1 | 7/2002 |

* cited by examiner

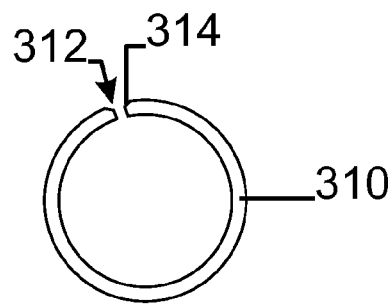
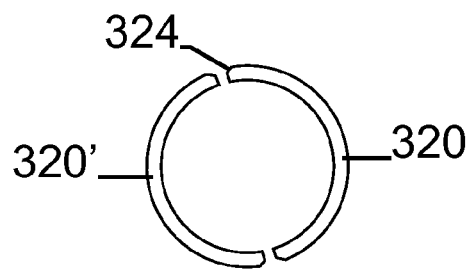
Fig. 3a
Fig. 3b
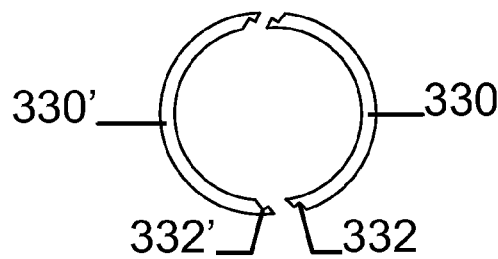
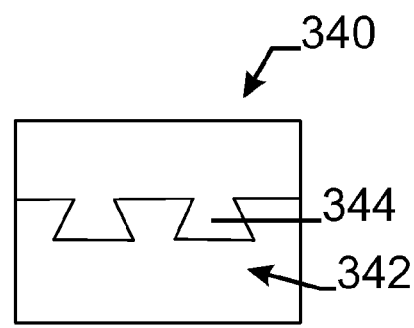
Fig. 3c
Fig. 3d
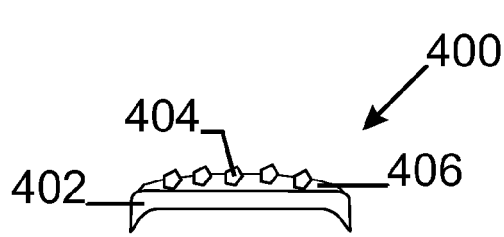
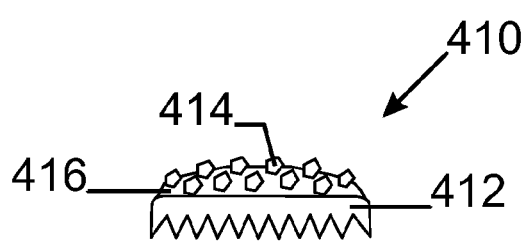
Fig. 4a
Fig. 4b

SAWING ROPE

TECHNICAL FIELD

The invention relates to a sawing rope that is used for cutting hard and brittle materials. More specifically the sawing rope is useful for cutting natural stone (such as limestone, marble, travertine, granite . . . ) but also for cutting man-made materials such as concrete, glass or ceramic materials.

BACKGROUND ART

The idea of teaming up the abrasion resistance of diamond grit with the flexibility of a wire rope to make a flexible sawing rope dates back from the fifties of the previous century. Some groundbreaking patents were—without pretending to be complete—GB 759 505, U.S. Pat. No. 2,679,839, U.S. Pat. No. 2,773,495. The technology settled around the basic design wherein a multifilament wire rope is threaded with 'beads' wherein diamond grit is impregnated. The beads are spaced apart by means of spacers that can be steel springs or polymer sleeves or a combination of both. From the 1970's onward, the diamond sawing rope replaced the loose abrasive sawing wire wherein steel wires or strands of various shape and make entrained slurry of water with an abrasive therein. Such technology was in use for block extraction in quarries. Although the diamond wire ropes still needed a coolant, the cumbersome supply of abrasive (such as sand or steel shot) was eliminated and a much higher sawing speed and use-time for the rope was achieved.

Sawing ropes have found different uses:
- They can be used on stationary machines to saw large blocks of natural stones into slabs for use in the building industry. While initially the machines were equipped with a single rope for sawing, nowadays multi wire saws are on the rise where in one single pass a whole block is sawn into slabs by multiple sawing ropes running parallel on grooved sheaves. Wire saws with as much as 52 wires are on the market.
- They can be used on mobile sawing machines to extract blocks of natural stone out of a quarry. One single rope led through a vertical and horizontal bore hole is closed into a loop, tensioned by a sawing machine that progresses on tracks. The rope is shortened regularly as the block is cut through.
- Various other heavy duty industrial uses such
  - as the sawing of steel bar reinforced concrete pillars, and segmenting sunken ships to remove the wreck in pieces, or
  - the cutting of the pillars on which off-shore oil drilling rigs are mounted when they are to be removed at the end of their life cycle are all successfully performed with sawing ropes.

A variety of designs of sawing ropes has emerged specifically adapted to the various uses. Sawing ropes wherein the beads are separated by helix springs (as first described in U.S. Pat. No. 2,679,839) are still widely used to cut softer stones like limestone and marble. The beads glide over the wire rope but at regular intervals a bead is fixed to the rope or replaced by a crimped metal sleeve in order to prevent an accumulation of compressed springs when one of the beads would get snagged. Such an accumulation of energy would make the beads deadly bullets in case the wire rope would snap.

Harder stones like granite require sawing ropes having plastic separators with or without encapsulated springs. Hence the beads are better fixed to the wire rope. The separators plastically deform in case one of the beads is caught in the cut. The energy is absorbed in the plastic deformation, but all following beads accumulate in a phenomenon known as "wire collapse". For the hardest materials like ceramics and reinforced concrete, the beads are separated by an elastomer such as rubber. A good description can be found in U.S. Pat. No. 4,907,564. The excellent adhesion between the rubber and the wire rope effectively transfers the forces on the bead to the wire rope while absorbing shocks. The adhesion is optimal when a brass coated steel wire rope is used in combination with an adhesive rubber, a combination that is very well known in tyre manufacturing.

The beads consist of a metal sleeve surrounded by an abrasive outer layer. The outer layer can be deposited electrolytically directly on the metallic sleeve as e.g. described in WO 02/40207, or it can be sintered into a ring shape and subsequently brazed or swaged to the metal sleeve as known form U.S. Pat. No. 3,847,569. The layer contains the abrasive grit—that is normally diamond—embedded in a metal or metal alloy. In case of electrolytic deposition this is usually nickel or a nickel alloy. In case of sintered rings it can comprise cobalt, copper, bronze, iron, tungsten, tungsten carbide (see e.g. EP 0486238). The layer can also be brazed directly (without sintering) on the sleeve as described e.g. in U.S. Pat. No. 7,089,925 B1.

The current size of the inner wire rope is standardised to 3.5 and 5 mm. The beads have an outer diameters of 7 to 11 mm. Hence at least 7 to 11 mm is lost in the cut. There is therefore a trend towards going to finer diameter sawing ropes that decrease the size of the cut. Such a reduced cut size is beneficial in terms of throughput as a thinner cut allows to obtain more slabs out of a single block in the same time. Normally there are from 25 to 40 beads per meter that are spaced regularly along the sawing rope. Soft stones require fewer beads per unit length than hard stones.

The way in which the sawing ropes are produced is always the same:
- the beads are produced,
- a wire rope is selected as the carrier,
- the beads are threaded on the rope with or without springs in between,
- a thermoplastic polymer or elastomer is injection molded between the beads by placing the rope and beads in suitable mold Possibly the beads are dressed prior to use in order to make them cut well from the start. The method to make the sawing rope is labour-intensive and slow as the mold only can contain a limited number of beads and hence the cable must be coated stepwise. Although the process can be automated, challenges remain in the productivity for making sawing ropes when going to finer diameters.

Other ways of making the sawing ropes have been suggested:
- U.S. Pat. No. 4,015,931 proposes to braze sintered abrasive elements directly to a compacted wire rope. Such a brazing will affect the tensile strength of the wire rope. Alternatively, a closing ring with abrasive elements brazed thereon can be locked directly around the wire rope. Such a connection is much too weak to hold the ring in place on a steel wire rope.
- WO 95/00275 and DE 2254328 suggest to insert abrasive elements during the braiding or cabling of the wire rope. Such an approach would lead to a non-uniform stiffness along the rope and a premature failure of the wires in the vicinity of the abrasive elements.
- JP2006102905 and U.S. Pat. No. 6,526,960 describe a sawing rope with a polymer jacket onto which one (or more) continuous wire is helicoidally wound. The wire comprises abrasive particles.

WO 02/055248 does not describe a sawing wire rope as envisaged in this application: it describes a cutting rope that is appropriate to cut deep-frozen foodstuff or clay bricks. The cutting pieces are crimped onto a wire rope but do not comprise an abrasive, nor is the wire rope coated with a polymer.

DISCLOSURE OF INVENTION

The main objective of the invention is to provide a sawing rope that can be manufactured in an efficient way. A further objective is to offer a sawing rope design that can be reduced in size. A still further objective is to offer a sawing rope that is simpler in design. A still further objective is to offer sawing ropes that are economically made in any kind of size and bead count per meter. The manufacturing method for making such a rope is also provided. The method enables to produce sawing ropes in long lengths.

According a first aspect of the invention a sawing rope is disclosed. Like every sawing rope it is build around wire rope. Such a wire rope is made of steel filaments. The steel filaments are normally made of plain carbon steel with a minimum carbon content of 0.40 wt % and a manganese content ranging from 0.40 wt % to 0.70 wt %. Alternatively the rope may be made of stainless steels such as AISI types 302/304, 316 and 305 although these are less preferred. The wires are cold drawn to increase their tensile strength. The steel filaments can be coated with a corrosion resistant coating such as a zinc or zinc alloy based coating (like e.g. zinc aluminium) or they can be coated with an adhesion promoting coating such as a brass alloy.

The wire rope is normally of the multi-strand type that is: it is assembled out of multiple strands each strand being composed out of multiple steel wires. A typical configuration is the 19+6×7 type of wire rope. This rope consists of a core with 19 wires that is surrounded by 6 strands each comprising 7 wires. The strands are made up from 6 outer wires that are twisted around a center wire. The core is made from a king wire around which first 6 wires are twisted and subsequently or concurrently another 12 wires are twisted. The filament diameters and lay lengths are chosen in function of the diameter and the clearances one wishes to obtain between the strands. Another possible wire rope comprises 7 strands each comprising 19 filaments twisted together in the same manner as the core of the 19+6×7 type. It is designated with 7×19. Still another popular construction is the 7×7 type of rope in which a core strand consisting of 7 wires (a king wire and 6 outer wires) twisted together is surrounded by 6 strands (with a central wire and also 6 outer wires twisted around it) twisted around the core. The diameter of the rope can be 3.5 or 5 mm although the inventors believe that a trend towards smaller wire rope diameters of 3 mm, and even 2 mm will take place.

The wire rope is coated with a polymer jacket. The function of the polymer jacket is to keep the abrasive element—the 'beads'—that grip in it in place and to isolate the wire rope from external influences. Hence the polymer must be sufficiently soft to allow gripping of the abrasive elements but at the same time it must be tough to withstand the abrasion by the stone. Most importantly the jacket must adhere well to the wire rope because if this would not be so, the abrasive elements will simply strip of the jacket in case one of the elements gets stuck in the cut. Minimally the strength of the bond should be such that at least $10 \times D \times L$ newton is needed to shear loose a single abrasive element in the rope. 'D' is the diameter of the wire rope and 'L' is the distance in between abrasive elements, both expressed in millimeter. For example an abrasive element on a wire rope with diameter 5 mm and an interdistance between the beads of 20 mm must be able to withstand $10 \times 5 \times 20$ i.e. 1000 N shear force. The presence of an adhesive layer between polymer and wire rope is therefore preferred in the invention.

The polymer jacket can be made of a thermoplastic type polymer, preferably a thermoplastic elastomer like: thermoplastic polyurethane (e.g. such as Desmopan® available form Bayer) or polyether block amide (e.g. such as PEBAX® from Arkema). Polyurethane is most preferred as it combines the correct properties of hardness and toughness. In order to achieve sufficient adhesion the use of an adhesive primer is preferred. Suitable primers are primers based on organofunctional silanes, organofunctional titanates or organofunctional zirconates. Alternative primers are available in the market (under the tradename Chemosil (Henkel) or Chemlok (Lord corporation)). The composition of these is not known but they are probably epoxy based.

Alternatively the polymer jacket can be made of an elastomer such as rubber. By far natural rubber (NR) or styrene butadiene rubber (SBR) rubbers are preferred for that. When mixed with the proper sulphur, fillers (such as carbon), accelerators and cobalt salt, excellent adhesion can be obtained on brass or zinc plated steel wire ropes. The brass or zinc coating then acts as a primer for adhesion. Other coatings based on metals or alloys out of the group comprising copper, zinc, tin, cobalt or bismuth can also act as an adhesive primer for rubber. The formulation of the rubber can be improved by standard experimentation to the level that sufficient adhesion can be obtained. Alternatively the Chemosil/Chemlok type of primers can be used to obtain a good adhesion with rubber.

The wire rope is coated with the polymer before closure of the metal sleeves. Alternatively the wire rope is coated with polymer after closure of the metal sleeve around the wire rope. The metal sleeve can be coated with an abrasive layer prior to closure of the sleeve. Alternatively the metal sleeve can be coated with an abrasive layer after the closure of the sleeve around the rope.

The abrasive elements comprise a metal sleeve and an abrasive outer layer. Characteristic about the inventive sawing rope is that the sleeves comprise a closure or connection for closing the sleeve around the metal rope. The polymer jacket may hold the abrasive elements in place. Alternatively the sleeves may grip on the polymer jacket of the wire rope, not on the wire rope itself. The sleeves are made of metal. The metal must have sufficient strength in order to maintain its shape during the sawing action. By preference iron containing alloys are used. Hence plain carbon steels are a good choice although stainless steels are therefore not a priori excluded.

The term 'sleeve' should not be interpreted narrowly. The following types of sleeve are considered within the scope of the invention:

a. A cylindrical element with a mechanical closure that closes around the jacketed wire rope, much alike a clip that is closed around the jacketed rope. The closure can be parallel to or oblique to the axis of the rope.

b. A cylindrical element that is formed out of two (possibly even more) half segments that are connected by means of for example a weld. By preference the weld is a laser weld. The connection can be parallel to or oblique to the axis of the rope.

c. Cylindrical segments like those of 'a.' or 'b.' above that mechanically interlock and are additionally welded at the lock.

d. A closely coiled wire of one or more turns where the ends are spot welded or laser welded to the adjacent winding such that the ends of the coil do not come loose. The welding can also be over the full length of adjacent windings of the coil. The connection is in that case always oblique to the axis of the wire rope and even of curvilinear shape.
e. The wire of 'd.' can have a circular shape or a flattened or oblong shape. A flattened shape results in more contact area with the polymer. A round wire makes a good imprint into the polymer jacket.
f. Particularly preferred is if the sleeve is formed from a flat wire having a thick middle portion sloping down towards the edges and this in a roughly hyperbolic profile. After bending the wire into a sleeve shape, the cylindrical piece shows an approximate one-sheeted, hyperboloid inner surface.

By preference the sleeve has a textured or structured inside surface that allows polymer to enter the inside surface structure for better grip of the sleeve to the polymer jacket. Different possibilities exist to provide such a profiled surface:
a. In case of a coiled round wire where adjacent turns are welded to one another, the inside of the sleeve is like a threaded surface that grips into the polymer.
b. In case of a coiled round wire abrasive particles can be present on the complete outer surface of the wire. When coiled onto the polymer jacket, the abrasive particles that arrive at the inside of the coil grip into the coil and improve retention of the abrasive element.
c. Alternatively—when the sleeve is cylindrical in shape—the inside of a cylindrical closed sleeve may be provided with screw thread after which the sleeve is cut prior to closing it over the jacketed wire rope.
d. When a flattened wire is coiled onto the jacketed rope, a ridge on the sides of the wire that grips into the polymer can be provided.
e. Alternatively the ridge of 'd.' can be serrated. The serration grips into the polymer jacket.
f. Alternatively longitudinal grooves can be provided in the flattened wire. After forming the sleeve, these grooves form circumferential grooves in the sleeve.
g. Alternatively holes or pyramids can be provided on the inner surface that grip into the polymer jacket of the rope.

The holding of the sleeves by the polymer jacket can be improved by making use of an adhesive primer on its own, or in combination with a structured inside surface of the sleeves. Basically the same primers that enable adhesion between the wire rope and the polymer jacket can be used to make the sleeve adhere to the polymer jacket. However, the primers need not be the same. Non-limitative examples are:
  An organofunctional silane is used to adhere the polymer jacket to the rope and a Chemosil based primer is used to adhere the sleeve to the jacket.
  A brass coating is used as a primer to obtain adhesion to rubber while a Chemosil based primer is used to adhere the sleeve to the jacket.

The abrasive layer is applied onto the sleeve either before or after the closure of the sleeve around the coated or uncoated rope. The following ways for applying the abrasive layer are envisaged:
  The abrasive layer is attached to the sleeve by means of a brazed bond ('by brazing'). A brazed bond is a metallic bond wherein a powder mixture of metals and the abrasive particles are melted onto the sleeve. All metals of the braze composition must go through a liquid phase and form an alloy. Typical braze alloy compositions contain at least two out of the group comprising tin, copper, nickel, cobalt, iron and silver. Particularly preferred alloys are cobalt based such as Fe—Cu—Co—Ag or Co—Cu—Sn.
  The sleeves can be electrolytically coated with a coating containing abrasive particles and, for example, nickel ('by deposition'). Other nickel alloys that are suitable for the purpose are Ni—Co, Ni—Mn, or Ni—Co—Mn.
  By preference the sleeves are coated with an abrasive layer by means of laser cladding, thermal spray or plasma spraying (in what follows these techniques are referred to 'by cladding'). Most preferred is the laser cladding technique. In this technique a metal powder and abrasive particles are gas propelled through a nozzle onto a spot on the sleeve. The sleeve spot is preheated by means of a high-power laser and the fed metal powder melts while the abrasive particles are impelled into it. After cooling a very good bond remains with the sleeve. The metal powder and the abrasive particles can be supplied mixed through a single nozzle. Or they can be sprayed through separate nozzles onto the hot spot. The gas must be a protective gas, usually argon, in order to prevent the abrasive particles and the metals from oxidation in the intense laser beam. The metal powder must have an elevated melting temperature (say between 400° to 900° C.) but not too high in order not to damage the abrasive particles. By preference the already mentioned braze alloys or bronzes are suitable for that (i.e. a copper based alloy). Examples are CuSn20Ti13 (i.e. a copper alloy with 20 wt % tin and 13 wt % titanium, the remainder being copper) or FeNiCr.
  The laser cladding technique is also preferred in that the sleeve can be closed by the welding action of the cladding at the same time as the sleeve is coated with an abrasive layer. In that case the abrasive layer material also acts as the weld material.

Combinations of any of the above techniques are not excluded either. E.g. a laser clad abrasive layer can further be supplemented with a brazed layer in order to fix the abrasive particles even better.

Particularly important for the lifetime of the sawing rope is that the matrix material wears at about the same rate as the abrasive particles. If the matrix material is too soft it will wear and release the abrasive particles too fast, while when it is too hard the sawing performance of the rope will be compromised.

The abrasive particles can be superabrasive particles such as diamond (natural or artificial, the latter being somewhat more preferred because of their lower cost and their grain friability), cubic boron nitride or mixtures thereof. For less demanding applications particles such as tungsten carbide (WC), silicon carbide (SiC), aluminium oxide ($Al_2O_3$) or silicon nitride ($Si_3N_4$) can be used: although they are softer, they are considerably cheaper than diamond. Most preferred is diamond.

For use in a sawing rope particle sizes of 40/50 US mesh size are most appropriate (US ASTME 11 standard). A 40 mesh sieve has openings of 420 μm where trough smaller sized particles pass. Particles on average larger than 297 μm will be stopped by the 50 mesh sieve (openings of 297 μm). The average mean size of the remaining particles is about 427 μm.

About 10 to 50 mg or 0.05 to 0.25 ct of diamond (1 carat is 200 milligram (mg)) should be present per 100 $mm^3$ of abrasive layer material. However, this diamond loading strongly depends on the diameter of the sawing rope and the length of the beads.

According a second aspect of the invention a method to produce a sawing rope is disclosed. The method comprises the steps of:
a. Providing a wire rope. The wire rope is of the type described above i.e. a steel wire rope of type 7×7, 19+6×7, 7×19 or similar made of carbon steel.
b. As a preferred option the wire rope is coated with an adhesive primer prior to jacketing (see above). Such adhesive primer can be applied on the steel wire prior to the making of the rope e.g. when metallic adhesive primers such as brass or zinc are envisaged for use with rubber (see discussion above).
c. Coating the wire rope with a polymer jacket. The polymer can be a thermoplastic polymer or an elastomer such as rubber as explained above.
d. Providing an open metal sleeve of the types described above.
e. Closing the open metal sleeve with a connection of a mechanical type or with a weld.
f. Providing an abrasive outer layer on the metal sleeve according to the methods of 'by brazing', 'by deposition' or by 'cladding' as explained above.

A first preferred production sequence ('sequence one') is the following:
Providing a wire rope (step 'a');
Optionally the rope is provided with a primer (step 'b')
Coating the wire rope with a polymer jacket (step 'c'),
    for this sequence by preference by an extrusion process whereby a whole length of wire rope is coated at once
Providing open metal sleeves (step 'd')
Closing the metal sleeve with a connection (step 'e').
    The metal sleeves are closed one after the other at fixed or variable distance from one another directly onto the polymer jacket.
Providing an abrasive outer layer on the metal sleeve (step 'f').
    In this sequence this is by preference done 'by deposition' or 'by cladding', as these techniques give the least heat load to the polymer jacket if the necessary provisions are taken.
By preference the step 'e' and step 'f' are combined within the same step, i.e. the sleeve is closed and coated immediately.

A second but equally preferred production sequence (sequence two) goes as follows:
Providing a wire rope (step 'a');
Providing open metal sleeves (step 'd')
Closing the metal sleeve with a connection (step 'e').
    The metal sleeves can still rotate freely around the wire rope.
Providing an abrasive outer layer on the metal sleeve (step 'f').
    In this sequence this is by preference done 'by cladding' or 'by brazing' as the heat load to the wire rope is much less as the metal sleeve is not in contact with the rope. When 'by cladding' is used the closing of the metal sleeve can be done at the same time as the application of the abrasive outer layer.
Optionally the rope with sleeves is provided with a primer (step 'b')
Coating the wire rope with a polymer jacket (step 'c').
    In this sequence this is done by preference by an injection molding process and wire rope is coated in a step by step manner.

A third also preferred production sequence (sequence three) goes as follows:
Providing a wire rope (step 'a');
Optionally the rope is provided with a primer (step 'b')
Coating the wire rope with a polymer jacket (step 'c'),
    for this sequence by preference by an extrusion process whereby a whole length of wire rope is coated at once
Providing open metal sleeves (step 'd').
    By preference the sleeve is in the form of a wire of round or oblong shape and in long lengths. The wire can be straight or in preformed in the shape of a helix.
Providing an abrasive outer layer on the metal sleeve (step 'f').
    Here this can be done 'by deposition', 'by cladding' or 'by brazing' as there is no thermal contact between the wire rope and the metal sleeve at all. By preference the sleeve is only coated on one side (the side that will be on the outer side of the sawing rope) to save abrasive material, but coating all sides of the sleeve has the additional advantage that it better grips into the polymer.
Closing the metal sleeve with a connection (step 'e').
    By preference this is done by coiling the abrasive coated wire around the jacketed rope, cutting the wire after a number of turns (say three to ten) and fixing the start and end of the coil to the adjacent turns of the coil by laser cladding. Alternatively the turns can be welded to one another everywhere where they are adjacent to one another.

The inventive concept common to all of the above mentioned methods is that the metal sleeve is closed over the rope and not threaded on the rope. As a consequence any type of metal sleeve will show a connection.

BRIEF DESCRIPTION OF FIGURES IN THE DRAWINGS

FIG. 1: shows the sawing rope as it is know in the art.
FIG. 2: shows three embodiments of the inventive sawing rope with a welded connection.
FIG. 3: shows a welded and two mechanical connections.
FIG. 4: shows a cross-sectional detail of the metal sleeves.
FIG. 5: illustrates two ways of producing the inventive sawing rope
FIG. 6: shows another cross-sectional detail of a preferred metal sleeves.

MODE(S) FOR CARRYING OUT THE INVENTION

FIG. 1 shows a sawing rope 100 as it is known it the art. A wire rope 12 made of several strands twisted together is covered with a polymer jacket 14. The wire rope has a diameter 'D'. At regular intervals sawing beads 20, 20', 20", are present separated by a distance 'L'. The beads are made of a short metal tube 16 on which an abrasive ring 18 is fixed (usually by brazing). The abrasive ring 18 is made of abrasive particles 22 in a metal matrix 24. The short metal tubes are made in one piece and have an internal threading (not shown) to yield a better grip by the polymer.

FIG. 2 shows three embodiments of the inventive sawing rope. FIG. 2a shows a first embodiment of the inventive sawing rope 200. Again a wire rope 212 is provided with a polymer jacket 214. Abrasive elements 220 comprising a metal sleeve 216 that grip into the polymer jacket 214 are provided at regular distances (only one abrasive element is shown but, they repeat at regular distances along the rope). On top of the metal sleeve an abrasive layer 218 is provided that contains abrasive particles 222 fixed in a matrix 224. The characteristic feature of the inventive sawing rope is that a connection 230 in the metal sleeve 216 is present. In this embodiment the connection is a weld 230 that is parallel to the axis of the rope.

FIG. 2b shows a second, alternative embodiment of the inventive sawing rope 240 of basically the same construction as the first embodiment but now the connection 260 is oblique to the axis of the rope. Again the connection 260 is a weld. The advantage of having the connection oblique to the axis of the wire rope is that the weld 260 is longer, hence forces working on the sleeve 250 that tend to open the weld during operation are spread over a larger distance i.e. the weld stress per unit length is less.

In FIG. 2c this idea has even been taken further in that the weld 290 is now helicoidally made on the metal sleeve of the abrasive element 280, which gives a third embodiment 270 of the inventive sawing rope.

FIG. 3 illustrates the different types of connections of the metal sleeve.

FIG. 3a shows a metal sleeve 310 in cross-section with one single opening 312. The opening is chamfered at 314 for receiving a weld.

FIG. 3b shows a metal sleeve that consists of two equal halves 320, 320'. Again the ends are chamfered at 324 for receiving a weld.

Figure 1:
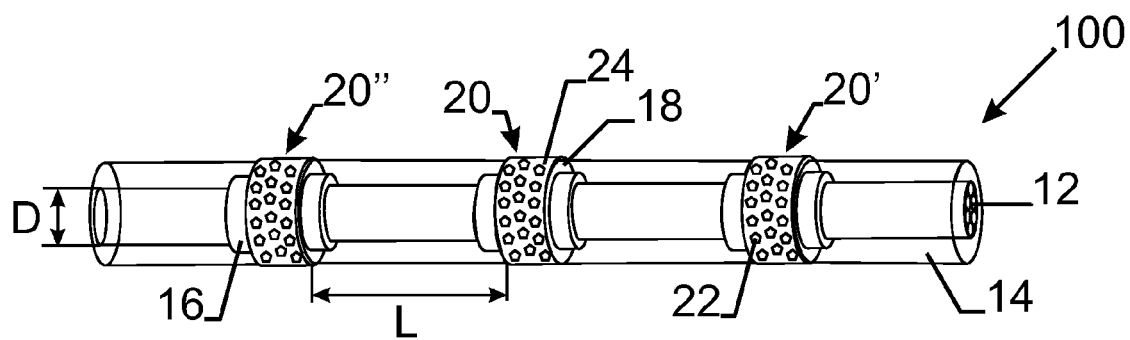
Figure 2A:
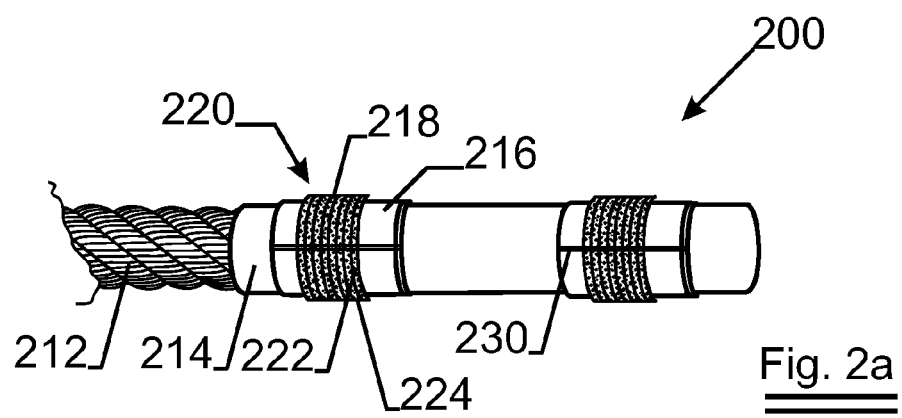
Figure 2B:
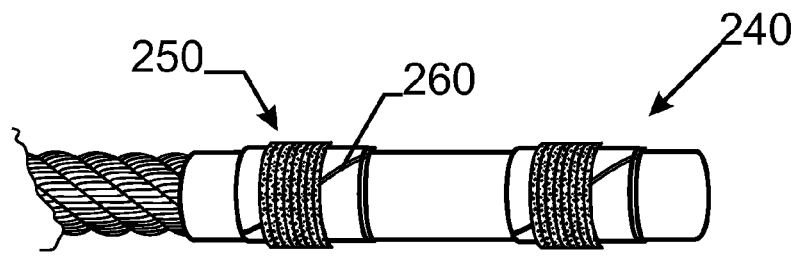
Figure 2C:
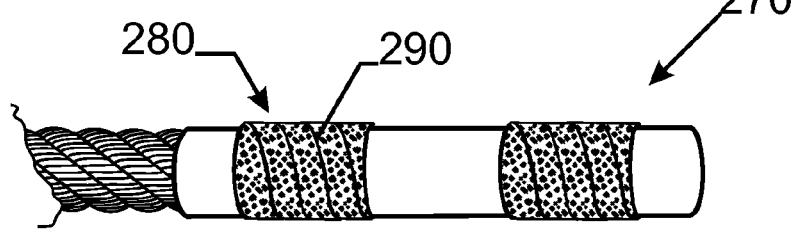

FIG. 3c illustrates a mechanical lock made of two pieces 330, 330'. The pieces lock into one another through a ridge 332 that engages in a recess 332'. Although such a mechanical lock is not sufficient to withstand the forces during sawing, the application of the abrasive layer will sufficiently lock the parts together.

FIG. 3d shows a mechanical lock 342 where the connection is of the curvilinear type. It consists of a single rectangular piece of metal that has interlocking dovetail ends 344. The sleeve 340 is curved around the rope and then mechanically locked. Again such a mechanical lock must be further strengthened by application of the abrasive layer.

Figure 6:
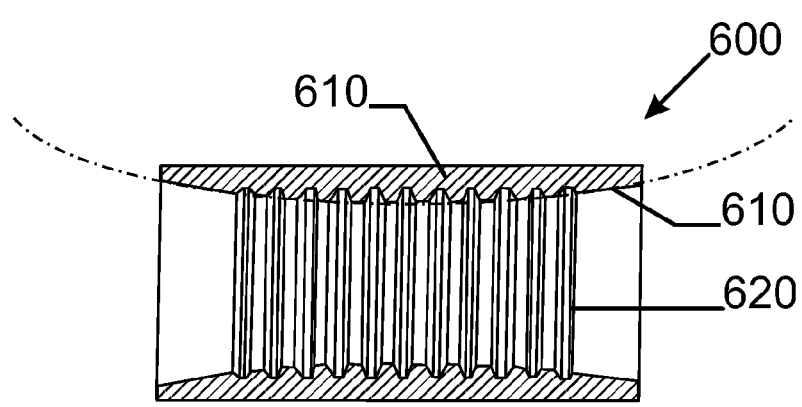

Cross-sections of embodiments of the abrasive elements are shown in FIGS. 4 'a' and 'b' and FIG. 6.

FIG. 4a shows an abrasive element 400 with a profiled base wire 402 with downward bent edges that forms the metal sleeve. The abrasive particles 404 are brought into a nickel matrix 406 by electroless nickel plating. As a result the particle layer is limited to one layer of abrasive particles.

FIG. 4b shows an abrasive element 410 (as the one depicted in FIG. 3b) wherein the surface of the metal sleeve 412 facing the polymer jacket is grooved for better grip into the polymer. The abrasive layer consists of diamonds 414 brought onto the sleeve 412 by laser cladding together with metal matrix 416.

FIG. 6 shows a sleeve 600 in cross-section wherein the inner surface 610 of the metal sleeve is thinned towards the edges. The resulting rounding is of roughly hyperbolic or quadratic shape. Grooves 620 can be provided on the inner surface. The advantage of using such hyperbolic or quadratic shape is that—when the sawing rope is bent—no sharp bend is induced on the wire rope at the exit and entry of the sleeve. This improves the working life of the wire rope greatly. Moreover, the trumpet shaped ends of the sleeve allow an easy flow-in of the polymer material during injection moulding, leading to an improved centring of the rope in the bead.

The sleeves of FIGS. 4a, 4b and 6 can be produced from a flat wire, shaped into the profile. The wire is then bent around the wire rope and subsequently closed by welding.

Figure 5A:
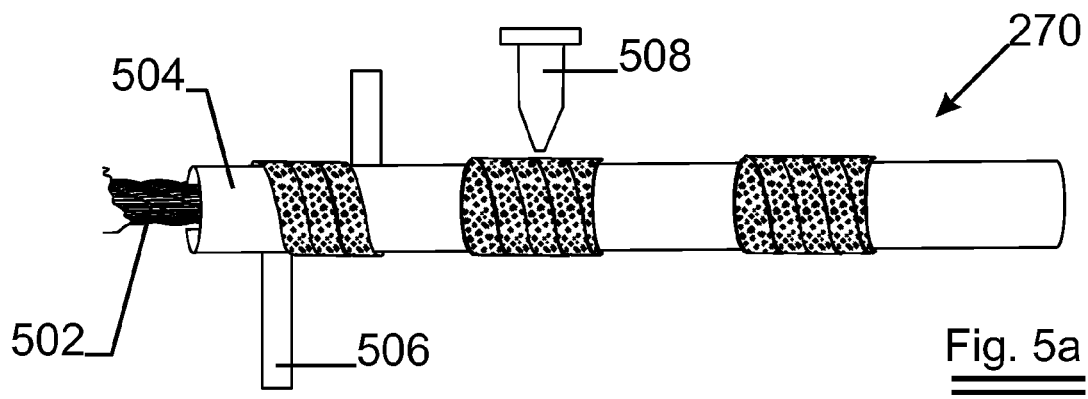
Figure 5B:
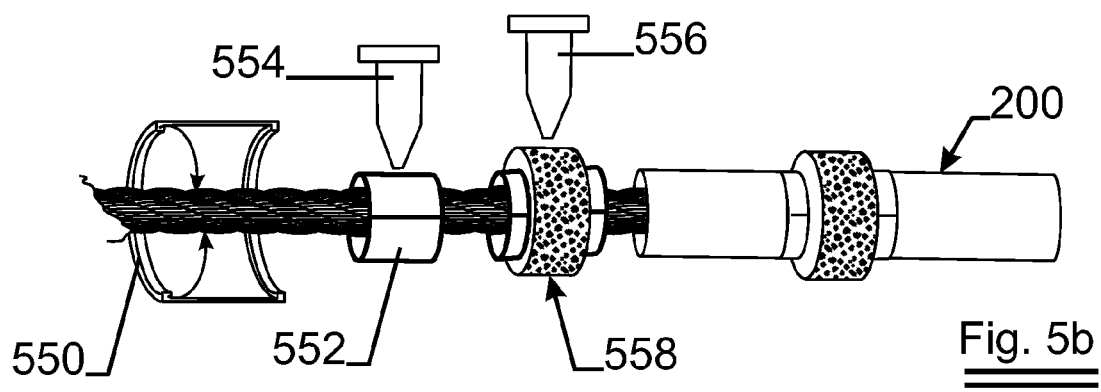

FIG. 5 shows two ways to produce the sawing rope. A first preferred way to produce the sawing rope 270 is as follows:

A galvanised steel wire rope 502 of construction 19+6×7 with an overall diameter of 4.5 mm is suitable as a carrier rope. Best adhesion results are obtained with wire ropes made of galvanised wires.

An organofunctional silane (such as aminopropyltrimethoxysilane) is most suitable as an adhesive primer.

In a continuous extrusion polyurethane polymer Desmopan® obtainable from Bayer can be applied as a polymer jacket 504 onto the wire rope 502 until an overall thickness of 5.0 mm is obtained.

A carbon steel wire 506 with a carbon content of 0.40 wt % carbon is shape rolled into the shape depicted in FIG. 4a, cut into lengths of about 50 cm and subsequently plated with blocky diamonds with an average size of 430 micron in an electroless nickel bath. The lengths are coated by lying the strips face down into the diamonds of the nickel bath. Subsequently the nickel layer is thickened in an electrolytic nickel bath.

The strips are coiled onto polymer jacket such that virtually no space remains between adjacent turns, while the two extending ends are used to hold the coil tightened (FIG. 5 'a' step (1)).

The seam between adjacent coil turns is laser welded by laser welder 508 and in the same operation the ends are laser-cut flush (FIG. 5 'a' step (2)). In this step attention has to be given to seek the correct laser power in order not to overheat the polymer.

A second preferred way of manufacturing the inventive sawing rope 200 is as follows (see FIG. 5b):

A 19+6×7 type of steel wire rope 550 made of galvanised steel wire with a diameter of 4.5 mm is taken.

Around this rope a metal sleeve 552 of the type depicted in FIG. 3b i.e. consisting of two halves with an inner diameter of 5 mm is closed around the rope by welding with laser welder 554. As the metal sleeve is not in direct contact with the steel wire rope, there is no heating of the cord.

Thereafter the closed metal sleeve 552 is coated with an abrasive layer by means of laser cladding through gun 556. Again blocky diamonds with a diameter of 430 μm are best suited. The matrix used is provided by cobalt, copper and tin alloy (CuSn20Ti13) powder blown into the hot spot of the laser weld. In this way the abrasive elements are on the rope, without having to thread them on. In this way an abrasive element like in FIG. 4b is obtained. Again, as the metal sleeve is not in contact with the wire rope, no appreciable heating of the cord occurs.

The cord is dipped in a solution of organofunctional silane in iso propyl alcohol and allowed to dry (not shown).

The abrasive elements 558 are fixed in position in a mold followed by injection molding of a polymer jacket (not shown). Due to the play between rope and metal sleeve, the polymer is injected into the recess between both. The grooved inner surface of the metal sleeve helps to keep the abrasive element in position.

The invention claimed is:

1. A sawing rope comprising a wire rope with a polymer jacket covering said wire rope, abrasive elements comprising a metal sleeve and an abrasive layer with abrasive particles, said metal sleeve being held by said polymer jacket for holding said abrasive elements fixed at intervals along said sawing rope, wherein said metal sleeve comprises at least one connection for closing said metal sleeve around said wire rope, wherein said metal sleeve has a structured inside surface comprising protrusions and/or recesses, wherein the protrusions comprise the shape of a pyramid, a smooth ridge, or a serrated ridge, and the recesses comprise holes and/or screw threading.

2. The sawing rope of claim 1, wherein said at least one connection is a weld, a mechanical lock, or a combination of both.

3. The sawing rope according to claim 2, wherein said connection is parallel, oblique, or curvilinear to the axis of the rope.

4. The sawing rope according to claim 1, wherein said at least one connection is parallel, oblique, or curvilinear to the axis of the wire rope.

5. The sawing rope according to claim 1, wherein said polymer jacket adheres to said wire rope by an adhesive primer.

6. The sawing rope according to claim 5, wherein said polymer is an elastomer and said adhesive primer is a metal alloy comprising one or more of the metals copper, zinc, tin, cobalt, or bismuth, said elastomer and said metal alloy being formulated for adhering to one another.

7. The sawing rope according to claim 5, wherein said polymer is a thermoplastic polymer and said adhesive primer is selected from the group comprising an organo functional silane, an organo functional titanate, and an organo functional zirconate.

8. The sawing rope according to claim 1, wherein said metal sleeve adheres to said polymer jacket by an adhesive primer.

9. The sawing rope according to claim 1, wherein the abrasive particles are attached to said metal sleeve by any one of a brazed bond, lytic deposition, laser cladding, or by a combination thereof.

10. The sawing rope according to claim 9, wherein said abrasive layer comprises particles selected from the group comprising diamond, cubic boron nitride, silicon carbide, aluminium oxide, silicon nitride, tungsten carbide, or mixtures thereof.

11. The sawing rope according to claim 10, wherein said abrasive layer comprises a metal matrix selected from the group comprising iron, nickel, cobalt, tin, copper, silver, or combinations thereof for holding said particles.

12. A sawing rope comprising a wire rope with a polymer jacket covering said wire rope, abrasive elements comprising a metal sleeve and an abrasive layer with abrasive particles, said metal sleeve being held by said polymer jacket for holding said abrasive elements fixed at intervals along said sawing rope,
wherein said metal sleeve comprises at least one connection for closing said metal sleeve around said wire rope, wherein an inner surface of said metal sleeve has the shape of a one-sheet hyperboloid.

13. The sawing rope according to claim 12, wherein said at least one connection is oblique or curvilinear to the axis of the wire rope.

14. The sawing rope according to claim 12, wherein said polymer jacket adheres to said wire rope by an adhesive primer.

15. The sawing rope according to claim 14, wherein said polymer is an elastomer and said adhesive primer is a metal alloy comprising one or more of the metals copper, zinc, tin, cobalt, or bismuth, said elastomer and said alloy being formulated for adhering to one another.

16. The sawing rope according to claim 14, wherein said polymer is a thermoplastic polymer and said adhesive primer is selected from the group comprising an organo functional silane, an organo functional titanate, and an organo functional zirconate.

17. The sawing rope according to claim 12, wherein said metal sleeve adheres to said polymer jacket by an adhesive primer.

18. The sawing rope according to claim 12, wherein the abrasive particles are attached to said metal sleeve by laser cladding.

19. The sawing rope according to claim 18, wherein said abrasive layer comprises a metal matrix selected from the group comprising iron, nickel, cobalt, tin, copper, silver, or combinations thereof for holding said particles.

20. A method of producing a sawing rope comprising the steps of:
Providing a wire rope;
Providing open metal sleeves;
Closing said open metal sleeves with a connection around said wire rope;
Providing an abrasive outer layer on the metal sleeves;
Optionally treating the wire rope with metal sleeves with a primer;
Coating the wire rope with a polymer jacket.

* * * * *